US012748030B2

(12) United States Patent
Dmochowski

(10) Patent No.: US 12,748,030 B2
(45) Date of Patent: Sep. 29, 2026

(54) APPARATUS TO MEASURE ELECTROPHORETIC MOBILITY

(71) Applicant: Wyatt Technology, LLC, Goleta, CA (US)

(72) Inventor: Grzegorz M. Dmochowski, Goleta, CA (US)

(73) Assignee: Wyatt Technology, LLC, Goleta, CA (US)

( * ) Notice: Subject to any disclaimer, the term of this patent is extended or adjusted under 35 U.S.C. 154(b) by 92 days.

(21) Appl. No.: 18/897,552

(22) Filed: Sep. 26, 2024

(65) Prior Publication Data

US 2025/0110035 A1 Apr. 3, 2025

Related U.S. Application Data

(60) Provisional application No. 63/586,696, filed on Sep. 29, 2023.

(51) Int. Cl.
*G01N 15/0205* (2024.01)
*G01N 15/00* (2024.01)
*G01N 15/1434* (2024.01)

(52) U.S. Cl.
CPC ..... *G01N 15/0211* (2013.01); *G01N 15/0205* (2013.01); *G01N 15/1434* (2013.01); (Continued)

(58) Field of Classification Search
CPC ........... G01N 15/0211; G01N 15/1434; G01N 2015/0003; G01N 2015/1454; G01N 27/44721; G01N 15/0205
See application file for complete search history.

(56) References Cited

U.S. PATENT DOCUMENTS 6,449,563 B1 * 9/2002 Dukhin .............. G01N 29/2468 702/22
11,181,503 B1 * 11/2021 Dickerman ............... G01P 5/26
(Continued)

FOREIGN PATENT DOCUMENTS

DE 102004047417 A1 * 5/2005 ......... G01N 15/0205
GB 2590883 A 7/2021

OTHER PUBLICATIONS

International Search Report and Written Opinion in PCT/US2024/048580 mailed on Oct. 21, 2025.
(Continued)

*Primary Examiner* — Georgia Y Epps
*Assistant Examiner* — Erin R Garber
(74) *Attorney, Agent, or Firm* — Schmeiser Olsen, PLLC

(57) ABSTRACT

The present disclosure describes an apparatus to measure electrophoretic mobility. In an embodiment, the apparatus includes a laser, a fiber splitter optically coupled to the laser, a polarization maintaining acousto-optic modulator optically coupled to a sample arm output of the splitter, a sample cell to contain a sample and optically coupled to an output of the acousto-optic modulator, a polarization maintaining combiner optically coupled to a reference arm output of the splitter and to an output of the sample cell, a photo detector to detect light outputted from the combiner, a radio frequency source electrically coupled to an input of the acousto-optic modulator, and a demodulator electrically coupled to an output of the photo detector and electrically coupled to an output of the radio frequency source, to output in-phase data and quadrature phase data to be analyzed for shifts in frequency to measure electrophoretic mobility in the sample.

17 Claims, 12 Drawing Sheets

(52) U.S. Cl.
CPC ................ *G01N 2015/0003* (2013.01); *G01N 2015/1454* (2013.01)

(56) References Cited

U.S. PATENT DOCUMENTS

| | | | | |
|---|---|---|---|---|
| 2008/0158561 | A1* | 7/2008 | Vacca | G01N 15/0205 356/338 |
| 2008/0221814 | A1 | 9/2008 | Trainer | |
| 2017/0227444 | A1* | 8/2017 | Jalai | G01N 15/1484 |
| 2019/0011398 | A1* | 1/2019 | Miller | G01N 15/00 |
| 2022/0038107 | A1* | 2/2022 | Hyman | H03L 7/0816 |
| 2024/0027958 | A1* | 1/2024 | Midtvedt | G03H 1/0465 |
| 2024/0210296 | A1* | 6/2024 | Kraft | G01N 15/0205 |

OTHER PUBLICATIONS

Tscharnuter, Walther W "Mobility measurements by phase analysis" Applied Optics vol. 40, No. 24, Aug. 20, 2001, pp. 3995-4003.

Miller, et al. "The determination of very small electrophoretic mobilities in polar and nonpolar colloidal dispersions using phase analysis light scattering" Journal of Colloid and Interface Science, vol. 143, No. 2, May 1, 1991, pp. 532-554.

* cited by examiner

APPARATUS TO MEASURE ELECTROPHORETIC MOBILITY

RELATED APPLICATION

This application claims priority to U.S. Provisional Patent Application No. 63/586,696 filed on Sep. 29, 2023 and titled "Apparatus to Measure Electrophoretic Mobility," the entirety of which is incorporated by reference herein.

BACKGROUND

The present disclosure relates to electrophoretic mobility, and more specifically, to an apparatus to measure electrophoretic mobility.

SUMMARY

The present disclosure describes an apparatus to measure electrophoretic mobility. In an exemplary embodiment, the apparatus includes (1) a long coherence length laser, (2) a fiber splitter optically coupled to the laser, (3) a polarization maintaining (PM) acousto-optic modulator (AOM) optically coupled to a sample arm output of the splitter, (4) a sample cell to contain a sample and optically coupled to an output of the acousto-optic modulator, (5) a polarization maintaining combiner optically coupled to a reference arm output of the splitter and to an output of the sample cell, (6) a photo detector to detect light outputted from the combiner, (7) a radio frequency (RF) source electrically coupled to an input of the acousto-optic modulator, and (8) an in-phase quadrature phase (IQ) demodulator electrically coupled to an output of the photo detector and electrically coupled to an output of the radio frequency source, to output in-phase data, I, and quadrature phase data, Q, to be analyzed for shifts in frequency to measure electrophoretic mobility in the sample.

In an exemplary embodiment, the apparatus includes (1) a long coherence length laser, (2) a fiber splitter optically coupled to the laser, (3) a polarization maintaining (PM) acousto-optic modulator (AOM) optically coupled to a reference arm output of the splitter, (4) a sample cell to contain a sample and optically coupled to a sample arm output of the splitter, (5) a polarization maintaining combiner optically coupled to an output of the acousto-optic modulator and to an output of the sample cell, (6) a photo detector to detect light outputted from the combiner, (7) a radio frequency (RF) source electrically coupled to an input of the acousto-optic modulator, and (8) an in-phase quadrature phase (IQ) demodulator electrically coupled to an output of the photo detector and electrically coupled to an output of the radio frequency source, to output in-phase data, I, and quadrature phase data, Q, to be analyzed for shifts in frequency to measure electrophoretic mobility in the sample.

DETAILED DESCRIPTION

Figure 1A:
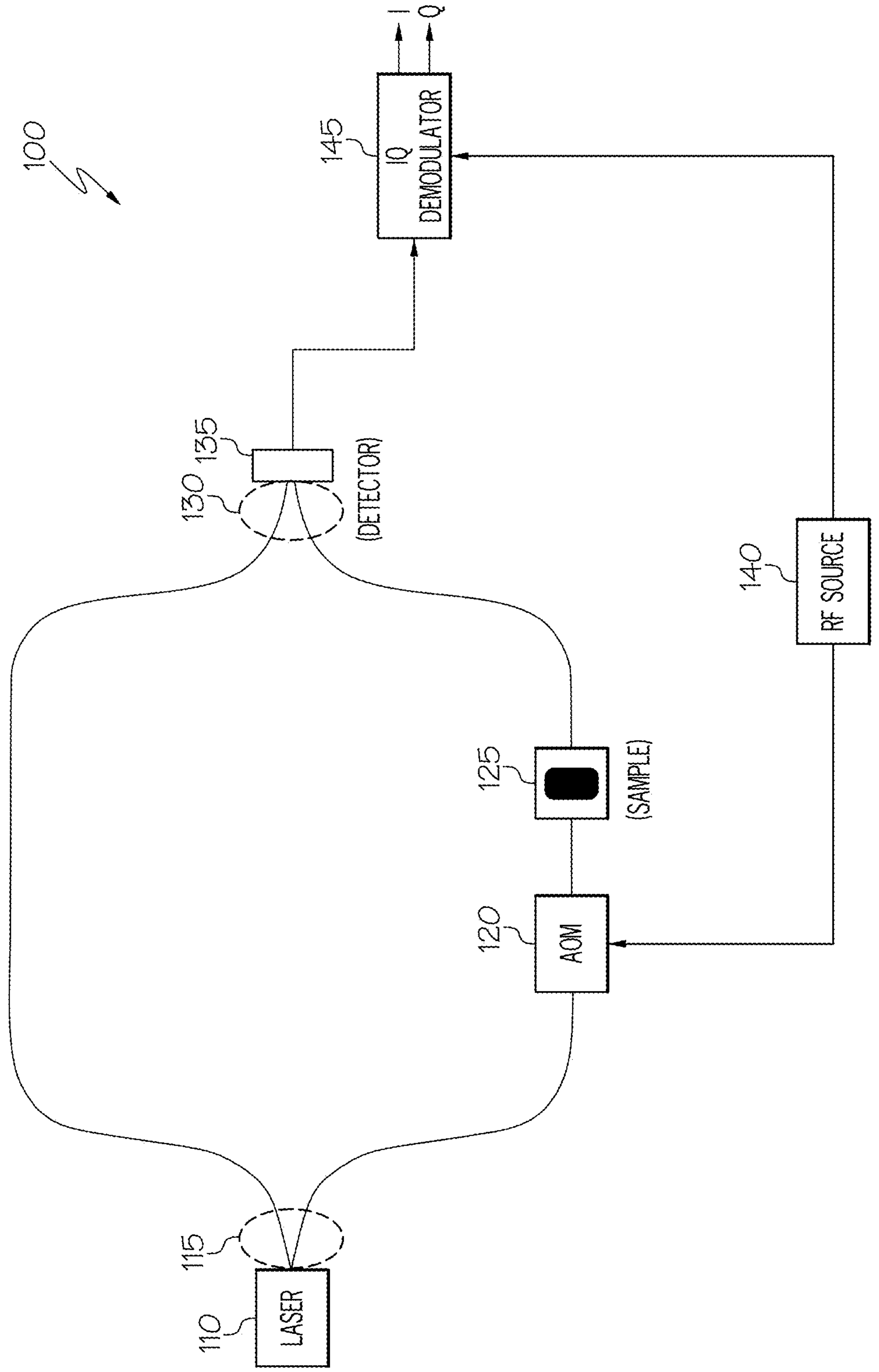
FIG. 1A depicts an apparatus in accordance with an exemplary embodiment.

The present disclosure describes an apparatus to measure electrophoretic mobility. In an exemplary embodiment, the apparatus includes (1) a long coherence length laser, (2) a fiber splitter optically coupled to the laser, (3) a polarization maintaining (PM) acousto-optic modulator (AOM) optically coupled to a sample arm output of the splitter, (4) a sample cell to contain a sample and optically coupled to an output of the acousto-optic modulator, (5) a polarization maintaining combiner optically coupled to a reference arm output of the splitter and to an output of the sample cell, (6) a photo detector to detect light outputted from the combiner, (7) a radio frequency (RF) source electrically coupled to an input of the acousto-optic modulator, and (8) an in-phase quadrature phase (IQ) demodulator electrically coupled to an output of the photo detector and electrically coupled to an output of the radio frequency source, to output in-phase data, I, and quadrature phase data, Q, to be analyzed for shifts in frequency to measure electrophoretic mobility in the sample. In an embodiment, the laser is a single frequency and polarized laser. In an embodiment, the splitter provides for the efficient use of laser light by having an asymmetric split ratio. In an embodiment, the AOM receives light and shifts the frequency, f, of the light, while leaking some light that maintained its original frequency. In an embodiment, the photo detector is a silicon photodiode, an avalanche photodiode or a photomultiplier tube.

In an exemplary embodiment, the apparatus includes (1) a long coherence length laser, (2) a fiber splitter optically coupled to the laser, (3) a polarization maintaining (PM) acousto-optic modulator (AOM) optically coupled to a reference arm output of the splitter, (4) a sample cell to contain a sample and optically coupled to a sample arm output of the splitter, (5) a polarization maintaining combiner optically coupled to an output of the acousto-optic modulator and to an output of the sample cell, (6) a photo detector to detect light outputted from the combiner, (7) a radio frequency (RF) source electrically coupled to an input of the acousto-optic modulator, and (8) an in-phase quadrature phase (IQ) demodulator electrically coupled to an output of the photo detector and electrically coupled to an output of the radio frequency source, to output in-phase data, I, and quadrature phase data, Q, to be analyzed for shifts in frequency to measure electrophoretic mobility in the sample.

In an embodiment, the apparatus obviates (a) the need to resolve a time-domain beat signal and (b) the need to detect or resolve a local oscillator, as in piezoelectric effect based electrophoretic mobility measurement instruments. In an embodiment, the apparatus results in improved phase stability between a local oscillator and a beat signal. In an embodiment, the apparatus removes any frequencies that (i) are outside the measurement bandwidth and (ii) have no definite phase relation with the local oscillator. In an embodiment, the in-phase quadrature phase (IQ) demodulator uses RF demodulation techniques to extract the Doppler frequency shift, allowing for the very precise generation of the orthogonal signal that is necessary in the demodulation. In a further embodiment, the apparatus further includes narrow-band filters that could eliminate much of the noise outside of the measurement bandwidth (i.e., a 'lock-in' technique).

In an embodiment, the apparatus allows for the detection of multiple mobility species in the sample by looking at the frequency domain representation of the demodulated signal outputted by the in-phase quadrature phase (IQ) demodulator, allowing for directly measuring the Doppler frequency shift of particles in the sample. In an embodiment, the apparatus allows for the calculating the electrophoretic mobility of particles in the sample by dividing the Doppler frequency shift by the electric field strength and scattering vector. Also, in an embodiment, the apparatus measures directly the entire spectrum of (Doppler) frequency shifts of particles in the sample, allowing for distinguishing between different mobilities within a single sample. In an embodiment, the apparatus directly measures the spectral width of the Doppler shift, allowing for inferring the size of the particles in the sample, also allowing for measuring electrophoretic light scattering and dynamic light scattering simultaneously.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Electrophoretic Light Scattering

Electrophoretic light scattering (ELS) is a technique used to measure the electrophoretic mobility of particles in dispersion, or molecules in solution. This mobility is often converted to Zeta potential to enable comparison of materials under different experimental conditions. The fundamental physical principle is that of electrophoresis. A dispersion is introduced into a cell containing two electrodes. An electrical field is applied to the electrodes, and particles or molecules that have a net charge, or more strictly a net zeta potential will migrate towards the oppositely charged electrode with a velocity, known as the mobility, that is related to their zeta potential.

When an electric field is applied to a sample, any charged objects in the sample will be influenced by that field. The extra movement that particles exhibit as a result of them experiencing the electric field is called the electrophoretic mobility. Its typical units are μm·cm/V·s (micrometer centimeter per Volt second) since it is a velocity [μm/s] per field strength [V/cm]. The electrophoretic mobility is the direct measurement from which the zeta potential can be derived (using either the Smoluchowski/Debye-Hückel approximations or the complete Henry function F(κa) to get from the mobility to a zeta potential).

Current Technology

Current ELS measurement instruments rely on comparing the light that is scattered off of particles with light that has not been scattered. Light that is scattered off of moving particles will be (Doppler) shifted in frequency by an amount proportional to the particle velocity. Light that has not been scattered, and therefore has not experienced a Doppler shift, will therefore have a slightly different frequency. By appropriate comparison, the presence of a Doppler shift can be detected and the particle velocity extracted.

Since optical frequencies are extremely high (350 THz), it is difficult to track the phase/frequency of the light directly (i.e. it is difficult to do the frequency comparison directly). A technique is commonly used to transfer this phase/frequency information down to manageable frequencies (kHz), involving overlapping the light with a third beam that is itself shifted in frequency by some kHz. The scattered light is combined with this 'reference' light and the result is an amplitude modulation at the difference frequency of the two light beams (the result of overlapping two beams with distinct frequencies is commonly called a 'beat signal'). Likewise, the unscattered light is itself combined with reference light and forms its own beat signal, with its amplitude oscillating at the difference frequency between the unscattered light and the reference light. Typically, a moving mirror is used to generate the frequency-shifted reference light, resulting in two different beat signals arising (at frequencies that are readily detected), one of which has a Doppler shift and the other does not. Comparison of these two different beat signals then allows for detecting the Doppler shift.

So, the current technology relies on the generation and detection of two different beat signals, necessitating a very stable apparatus since any mechanical vibrations would cause unwanted (unaccounted for) frequency shifts on one beat signal compared to the other. Moreover, since a moving mirror is used to generate the frequency shifted reference light, the size of this frequency shift is confined to a few kHz. Also, the motion of the mirror is non-linear (it slows down as it reverses direction) and so produces a reference frequency that changes with time. Thus, there is a need for an apparatus to measure electrophoretic mobility.

Figure 1B:
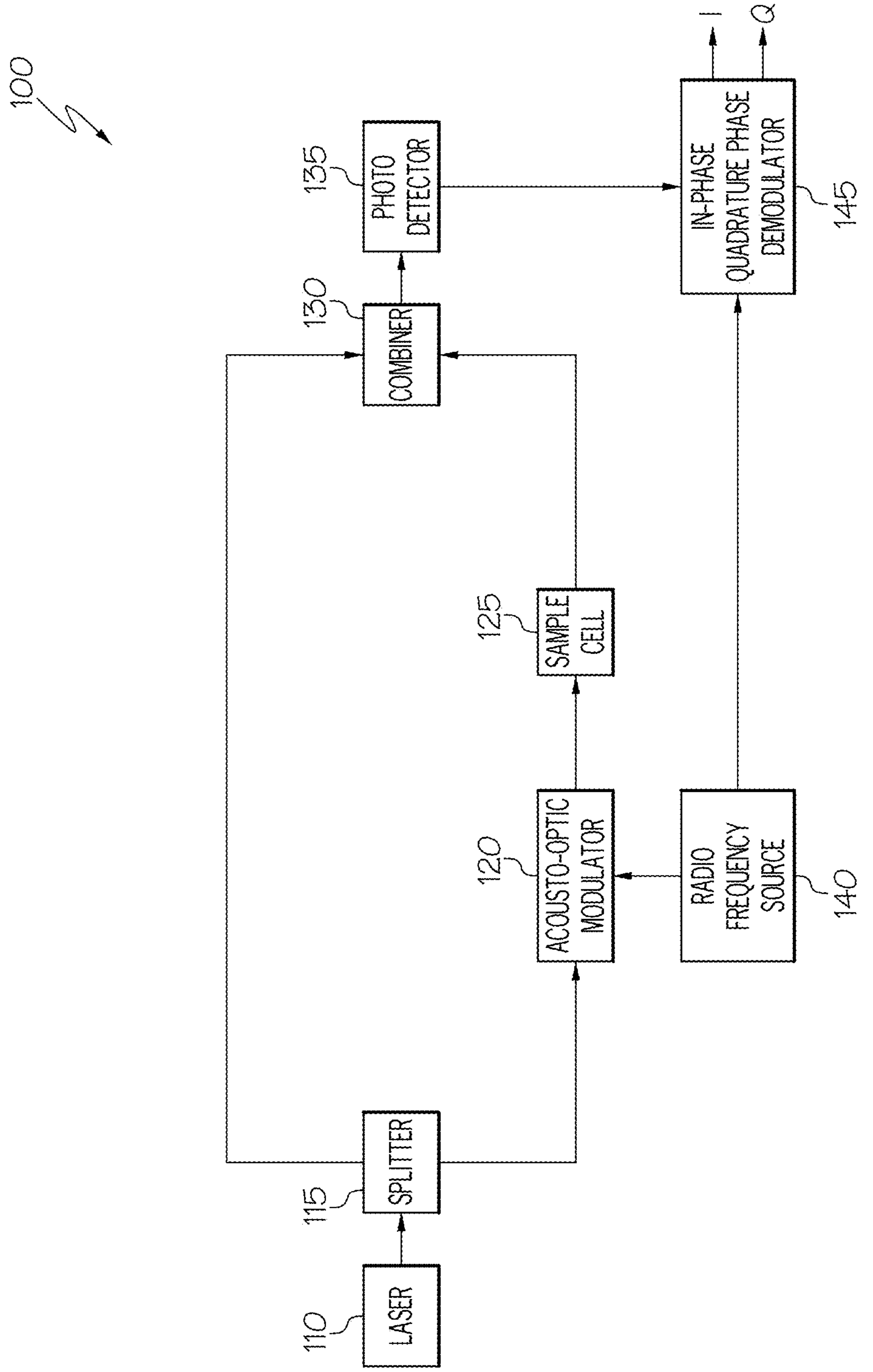
FIG. 1B depicts an apparatus in accordance with an exemplary embodiment.

In an embodiment, FIG. 1A and FIG. 1B depict the apparatus including (1) a long coherence length laser 110, (2) a fiber splitter 115 optically coupled to laser 110, (3) a polarization maintaining acousto-optic modulator 120 optically coupled to a sample arm output of splitter 115, (4) a sample cell 125 to contain a sample and optically coupled to an output of acousto-optic modulator 120, (5) a polarization maintaining combiner 130 optically coupled to a reference arm output of splitter 115 and to an output of sample cell 125, (6) a photo detector 135 to detect light outputted from combiner 130, (7) a radio frequency source 140 electrically coupled to an input of acousto-optic modulator 120, and (8) an in-phase quadrature phase demodulator 145 electrically coupled to an output of photo detector 135 and electrically coupled to an output of radio frequency source 140, to output in-phase data, I, and quadrature phase data, Q, to be analyzed for shifts in frequency to measure electrophoretic mobility in the sample. In a further embodiment, the apparatus further includes at least one polarization maintaining (PM) fiber coupling any of laser 110, splitter 115, acousto-optic modulator 120, sample cell 125, and combiner 130 together. For example, the PM fiber is a standard coupling (e.g., a FCP coupling). In an embodiment, any of splitter 115, acousto-optic modulator 120, and combiner 130 are fused together, where such fused components could result in better performance of the apparatus.

In an embodiment, splitter 115 includes a split ratio where a majority of laser light emitted by the laser is directed to sample cell 125. For example, the split ratio could be such that 50%-99.1% of the laser light is directed to sample cell 125 (e.g., 96:4 split ratio with 96% of the laser light directed to sample cell 125 and 4% of the light directed to the reference arm output of splitter 115). In an embodiment, sample cell 125 includes a shutter between a cell enclosure and a collimator. In an embodiment, acousto-optic modulator 120 includes a polarizer.

Figure 1C:
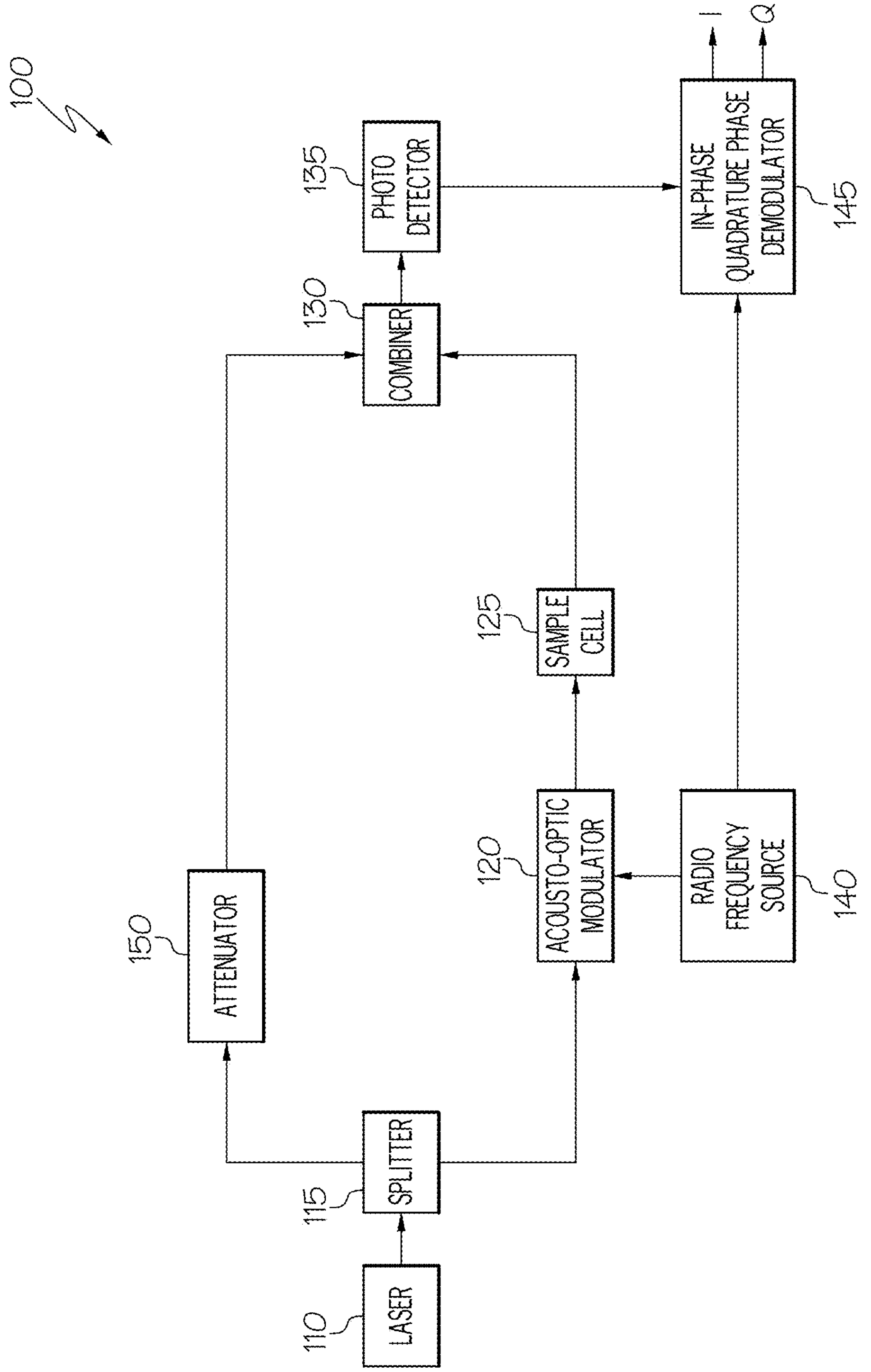
FIG. 1C depicts an apparatus in accordance with an exemplary embodiment.

In a further embodiment, as depicted in FIG. 1C, the apparatus further includes a polarization maintaining attenuator 150 optically coupled to the reference arm output of splitter 115. In an embodiment, attenuator 150 controls power levels of photo detector 135. In an embodiment, in-phase quadrature phase (IQ) demodulator 145 includes a low pass filter to the in-phase data, I, and the quadrature phase data, Q.

Figure 2A:
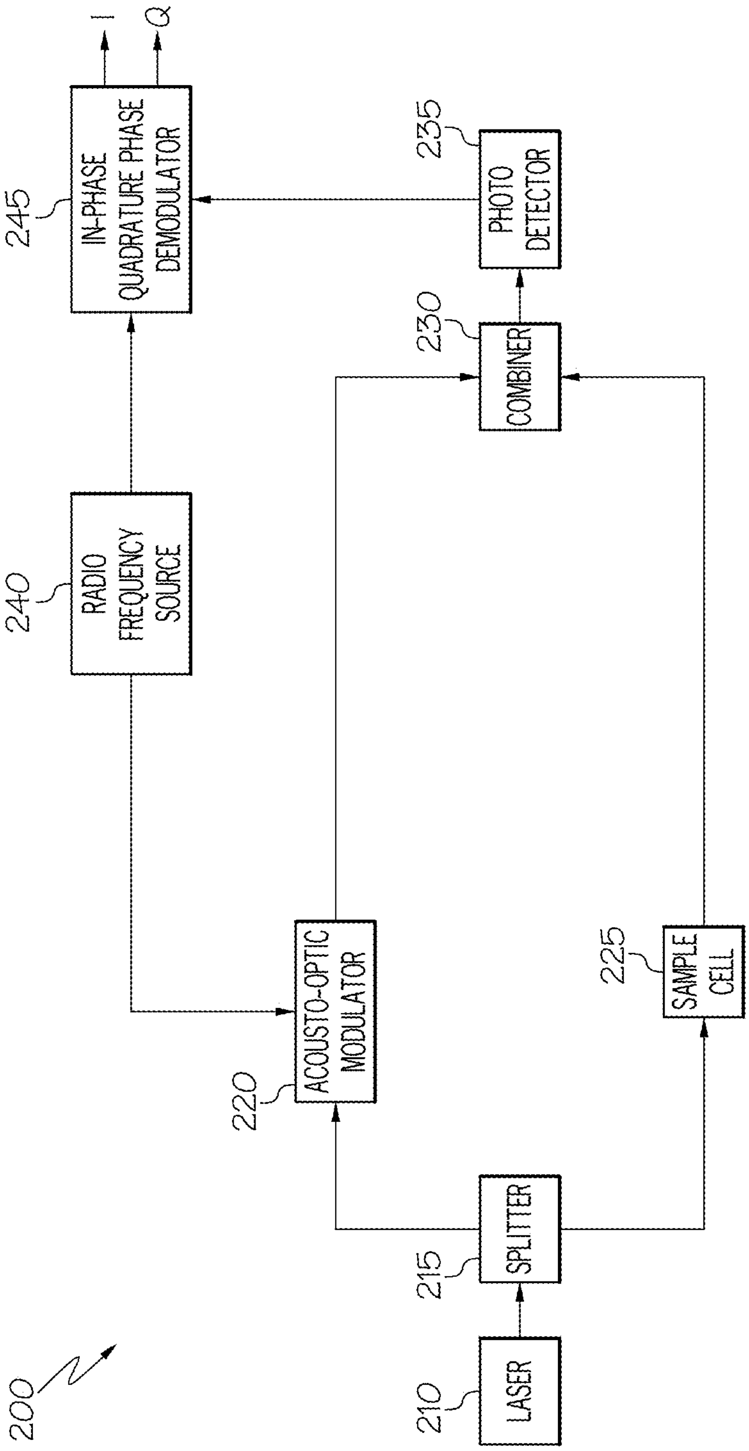
FIG. 2A depicts an apparatus in accordance with an exemplary embodiment.

In an embodiment, FIG. 2A depicts the apparatus including (1) a long coherence length laser 210, (2) a fiber splitter 215 optically coupled to laser 210, (3) a polarization maintaining acousto-optic modulator 220 optically coupled to a reference arm output of splitter 215, (4) a sample cell 225 to contain a sample and optically coupled to a sample arm output of splitter 215, (5) a polarization maintaining combiner 230 optically coupled to an output of acousto-optic modulator 220 and to an output of sample cell 225, (6) a photo detector 235 to detect light outputted from combiner 230, (7) a radio frequency source 240 electrically coupled to an input of acousto-optic modulator 220, and (8) an in-phase quadrature phase demodulator 245 electrically coupled to an output of photo detector 235 and electrically coupled to an output of radio frequency source 240, to output in-phase data, I, and quadrature phase data, Q, to be analyzed for shifts in frequency to measure electrophoretic mobility in the sample. In a further embodiment, the apparatus further includes at least one polarization maintaining (PM) fiber coupling any of laser 210, splitter 215, acousto-optic modulator 220, sample cell 225, and combiner 230 together. For example, the PM fiber is a standard coupling (e.g., a FCP coupling). In an embodiment, any of splitter 215, acousto-optic modulator 220, and combiner 230 are fused together, where such fused components could result in better performance of the apparatus.

In an embodiment, splitter 215 includes a split ratio where a majority of laser light emitted by the laser is directed to sample cell 225. For example, the split ratio could be such that 50%-99.1% of the laser light is directed to sample cell 225 (e.g., 96:4 split ratio with 96% of the laser light directed to sample cell 225 and 4% of the light directed to the reference arm output of splitter 215). In an embodiment, sample cell 225 includes a shutter between a cell enclosure and a collimator. In an embodiment, acousto-optic modulator 220 includes a polarizer.

Figure 2B:
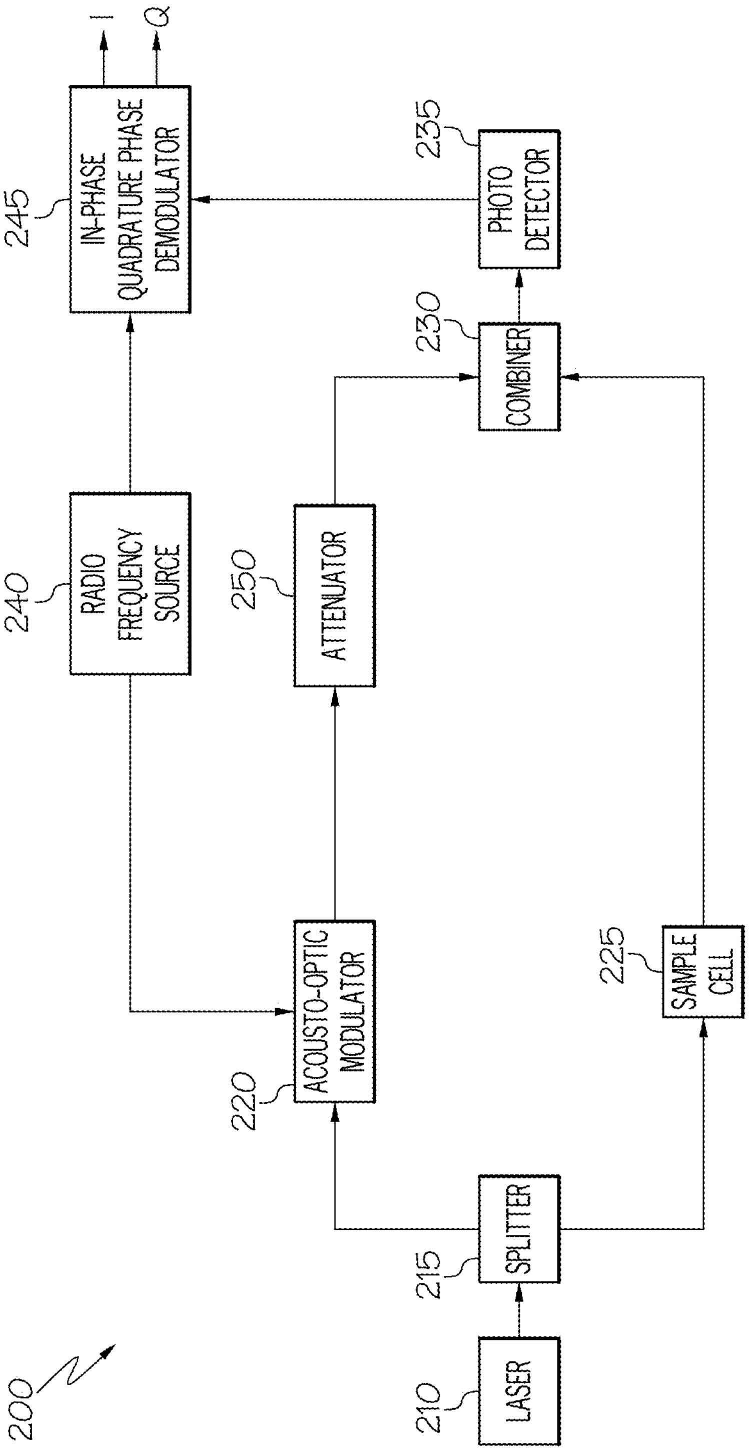
FIG. 2B depicts an apparatus in accordance with an exemplary embodiment.

In a further embodiment, as depicted in FIG. 2B, the apparatus further includes a polarization maintaining attenuator 250 optically coupled to the reference arm output of splitter 215. In an embodiment, attenuator 250 controls power levels of photo detector 235. In an embodiment, in-phase quadrature phase (IQ) demodulator 245 includes a low pass filter to the in-phase data, I, and the quadrature phase data, Q.

EXAMPLE

Figure 3:
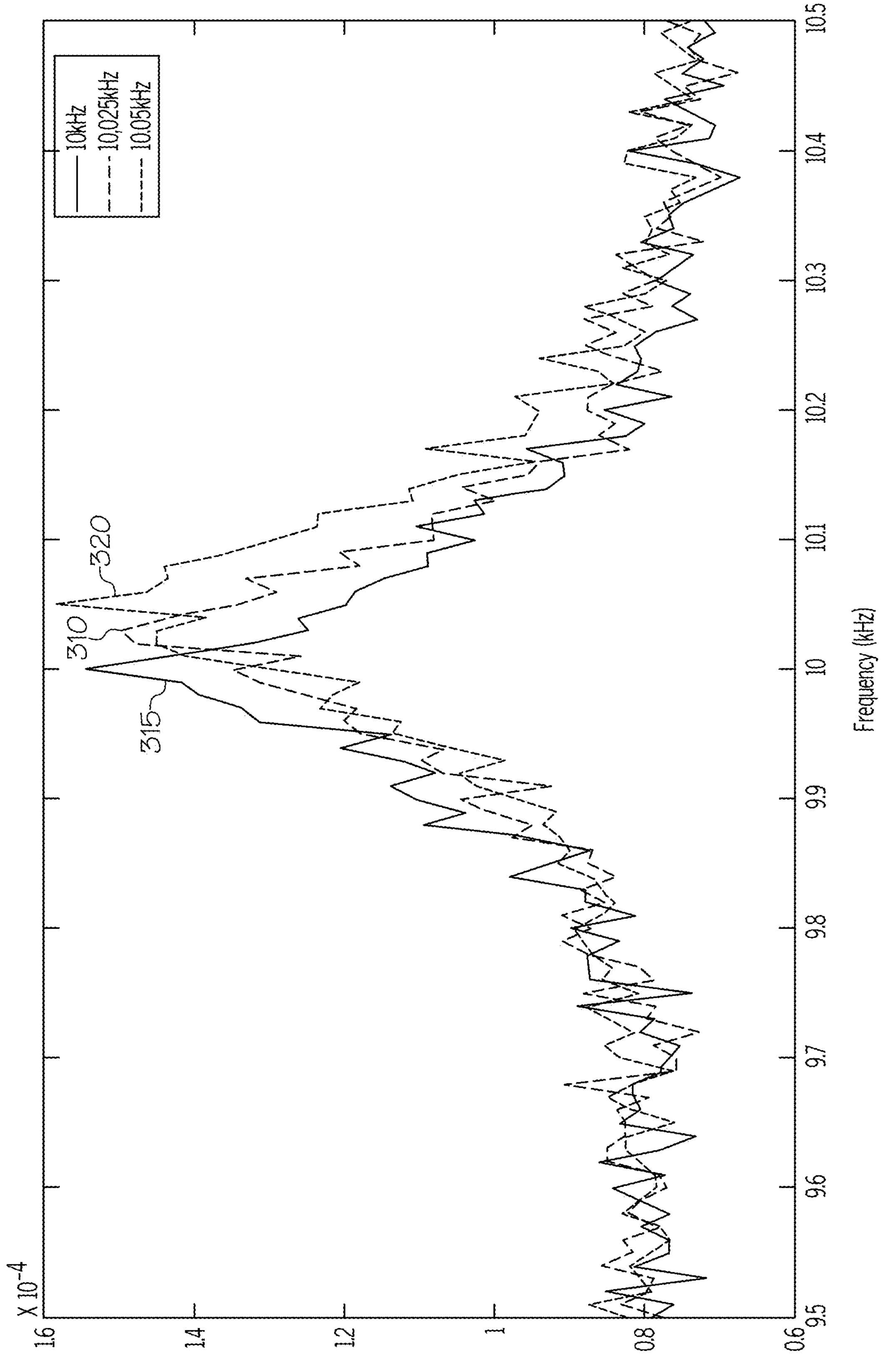
FIG. 3 depicts a graph in accordance with an embodiment.
Figure 4:
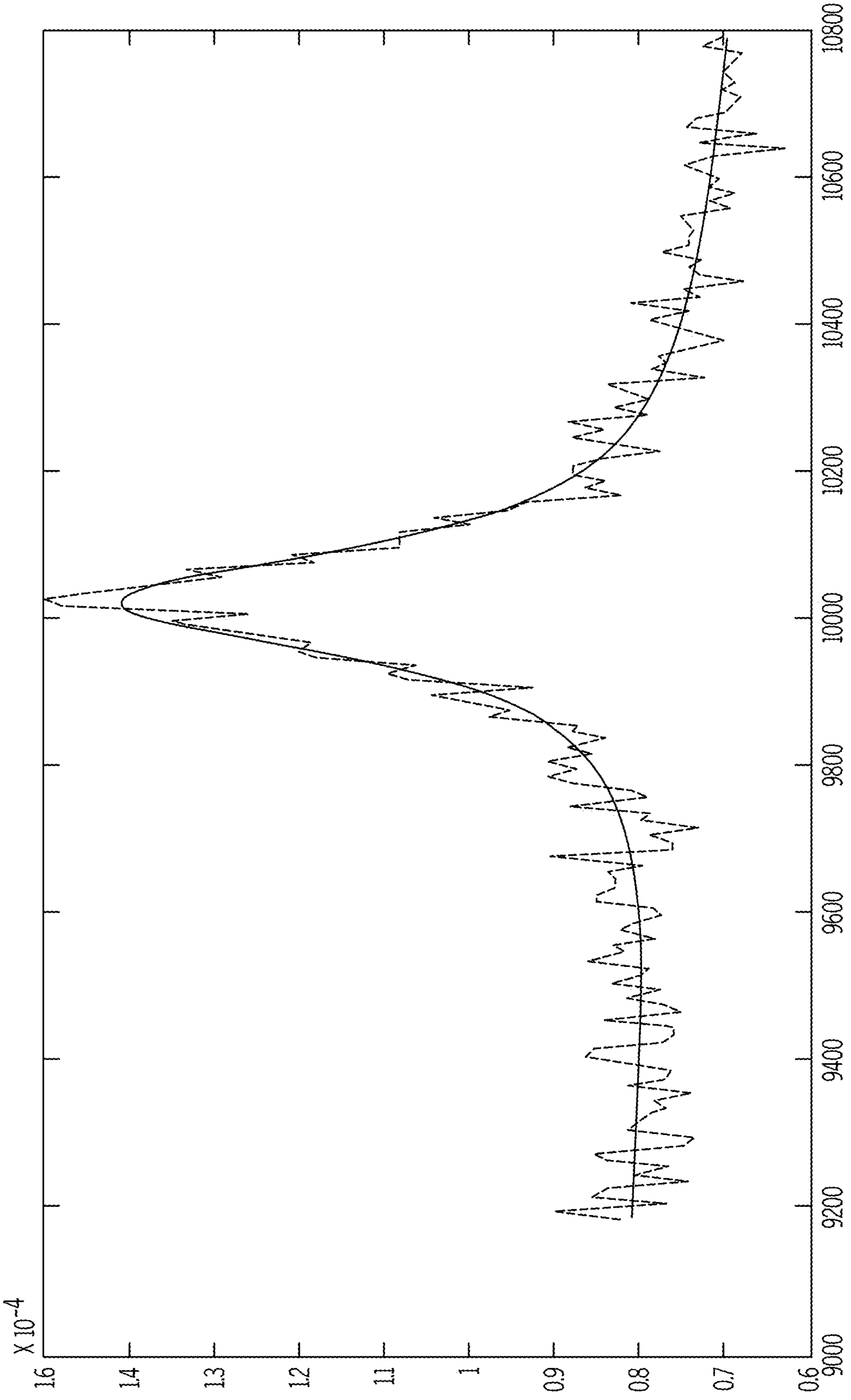
FIG. 4 depicts a graph in accordance with an embodiment.

For example, FIG. 3 depicts the apparatus shifting a spectrum of the data 310 to the left by 0.025 kHz, as shown in trace 315, and to the right by 0.025 kHz, as shown in trace 320, where data 310 corresponds to data gathered by photo detector 135 from a sample of 200 nm polystyrene spheres. In another example, FIG. 4 depicts radius data extracted from the data outputted by in-phase quadrature phase demodulator 145, 245. In particular, FIG. 4 shows fitting a width of the data trace to a Lorentzian fit for radius extraction.

Figure 5:
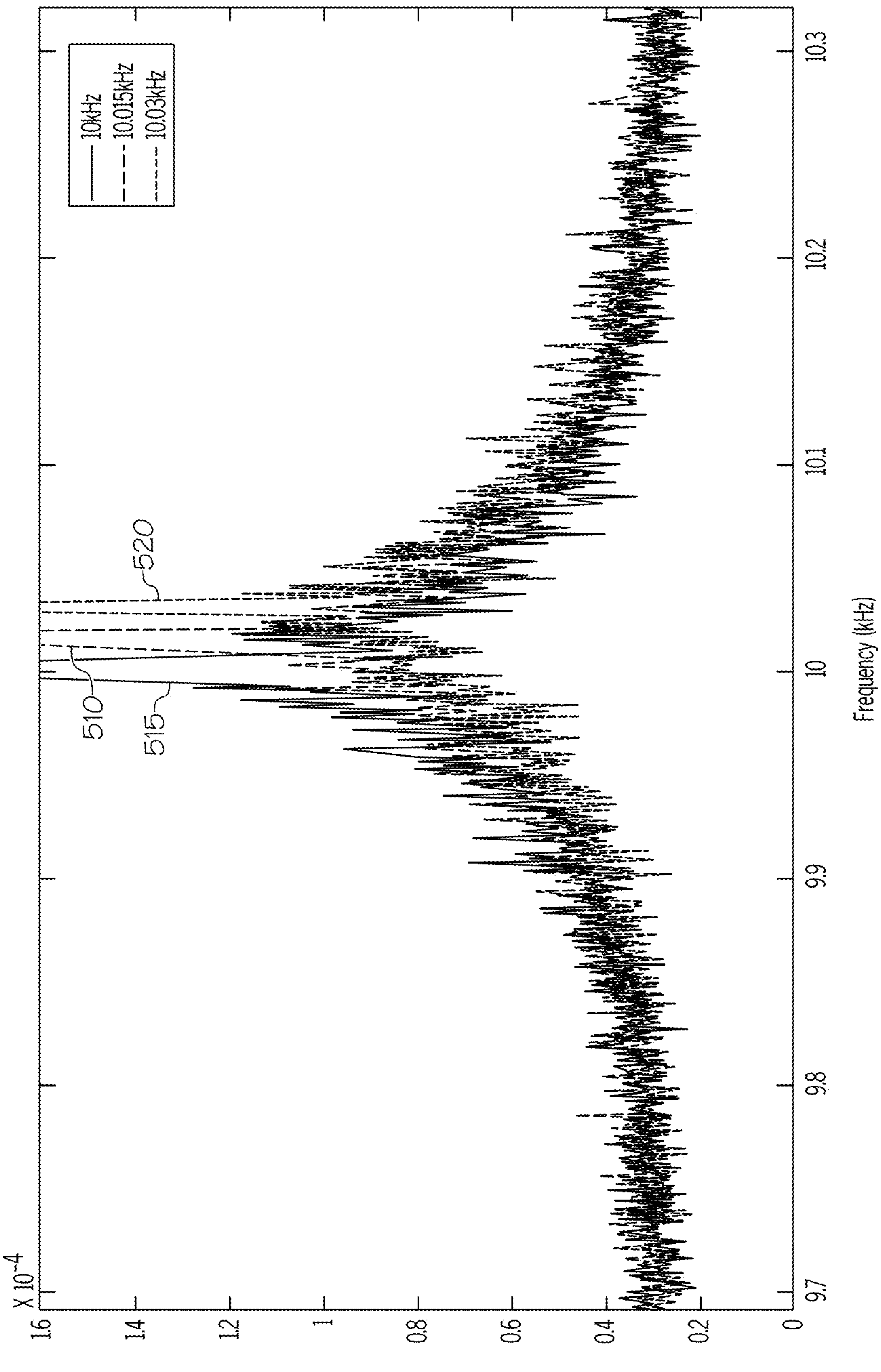
FIG. 5 depicts a graph in accordance with an embodiment.

Also, for example, FIG. 5 depicts the apparatus shifting a spectrum of the data 510 to the left by 0.015 kHz, as shown in trace 515, and to the right by 0.015 kHz, as shown in trace 520, where data 510 corresponds to data gathered by photo detector 235 from a sample of 2.5 mg/mL bovine serum albumin (BSA).

Figure 6A:
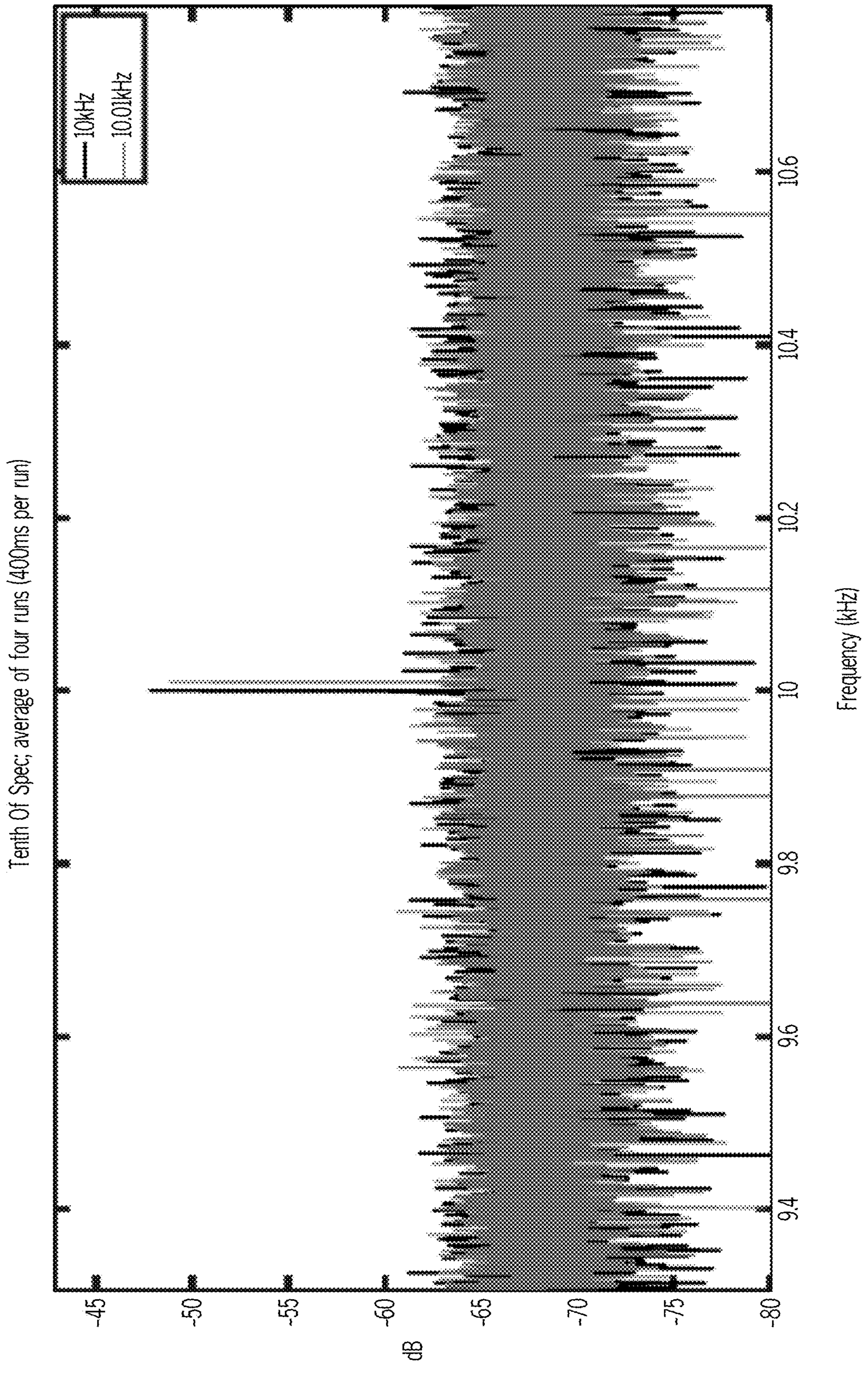
FIG. 6A depicts a graph in accordance with an embodiment.
Figure 6B:
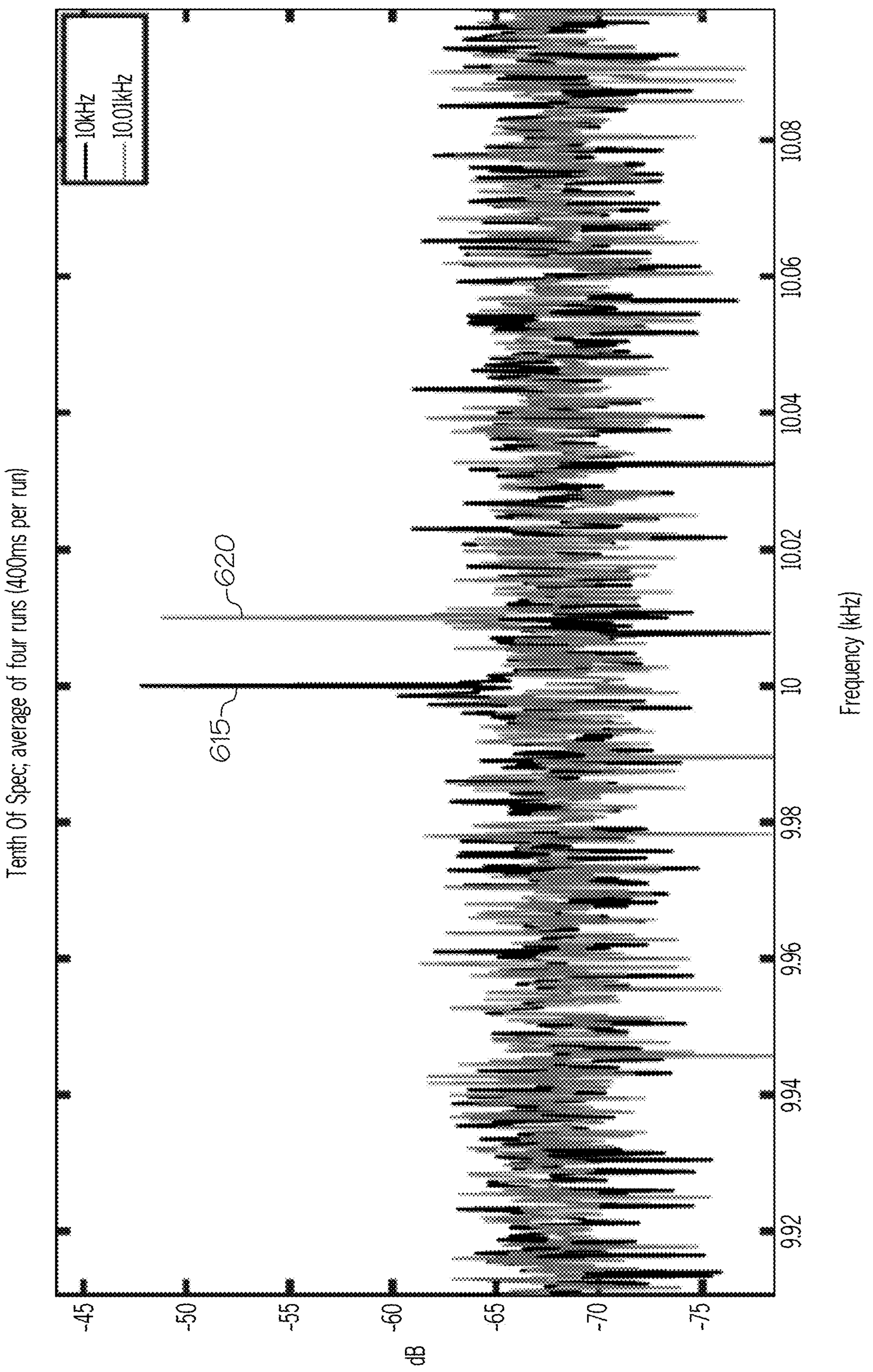
FIG. 6B depicts a graph in accordance with an embodiment.

In another example, FIG. 6A depicts a spectrum of the data outputted by in-phase quadrature phase demodulator 145, 245, obtained by applying a Fast Fourier Transform (FFT) to the data. In a further example, FIG. 6B depicts how the data outputted by in-phase quadrature phase demodulator 145, 245, could allow the apparatus to resolve very small shifts, 615 and 620, in frequency in the data, by observing the FFTs of the data.

Figure 7:
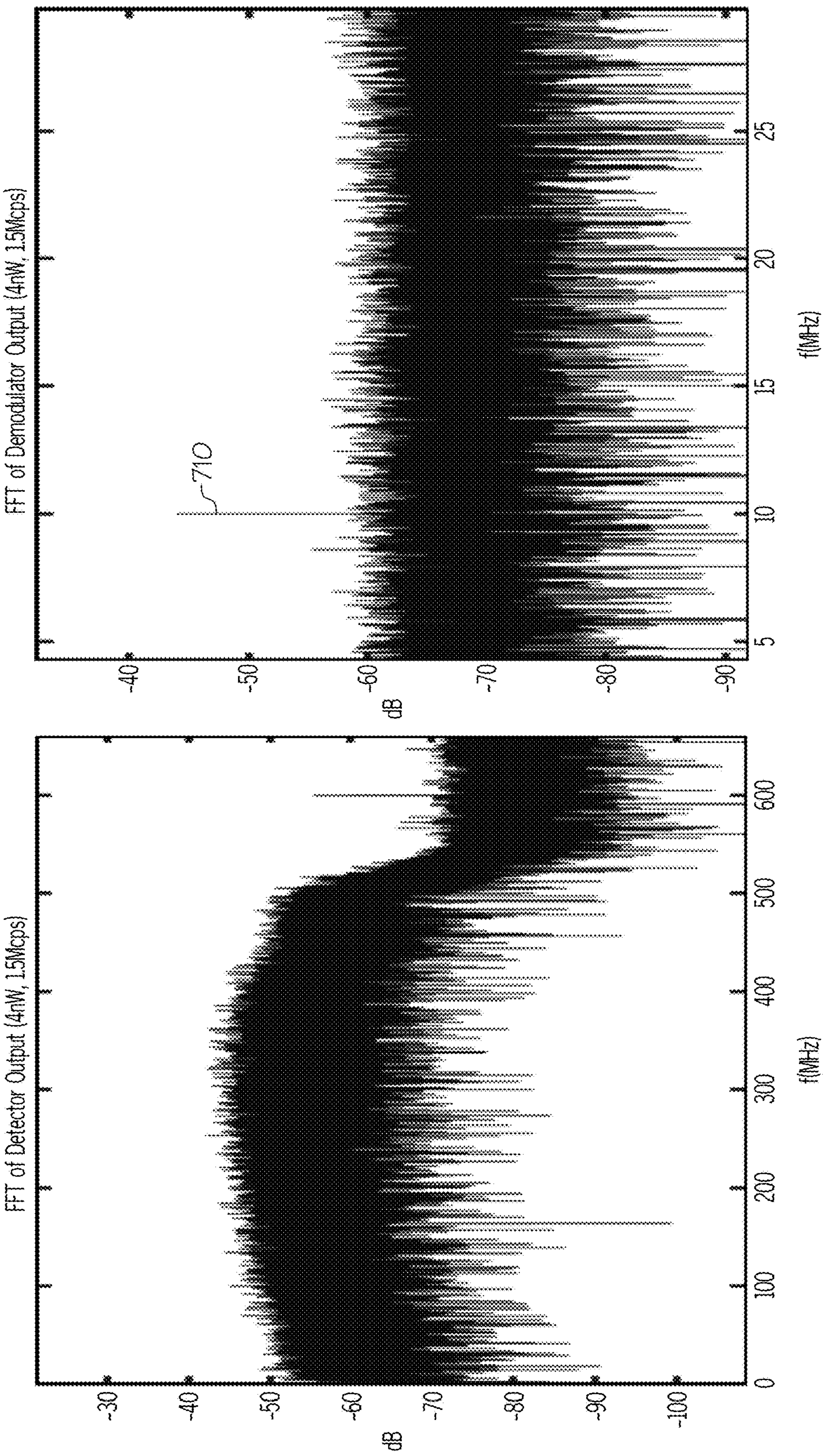
FIG. 7 depicts a graph in accordance with an embodiment.
Figure 8:
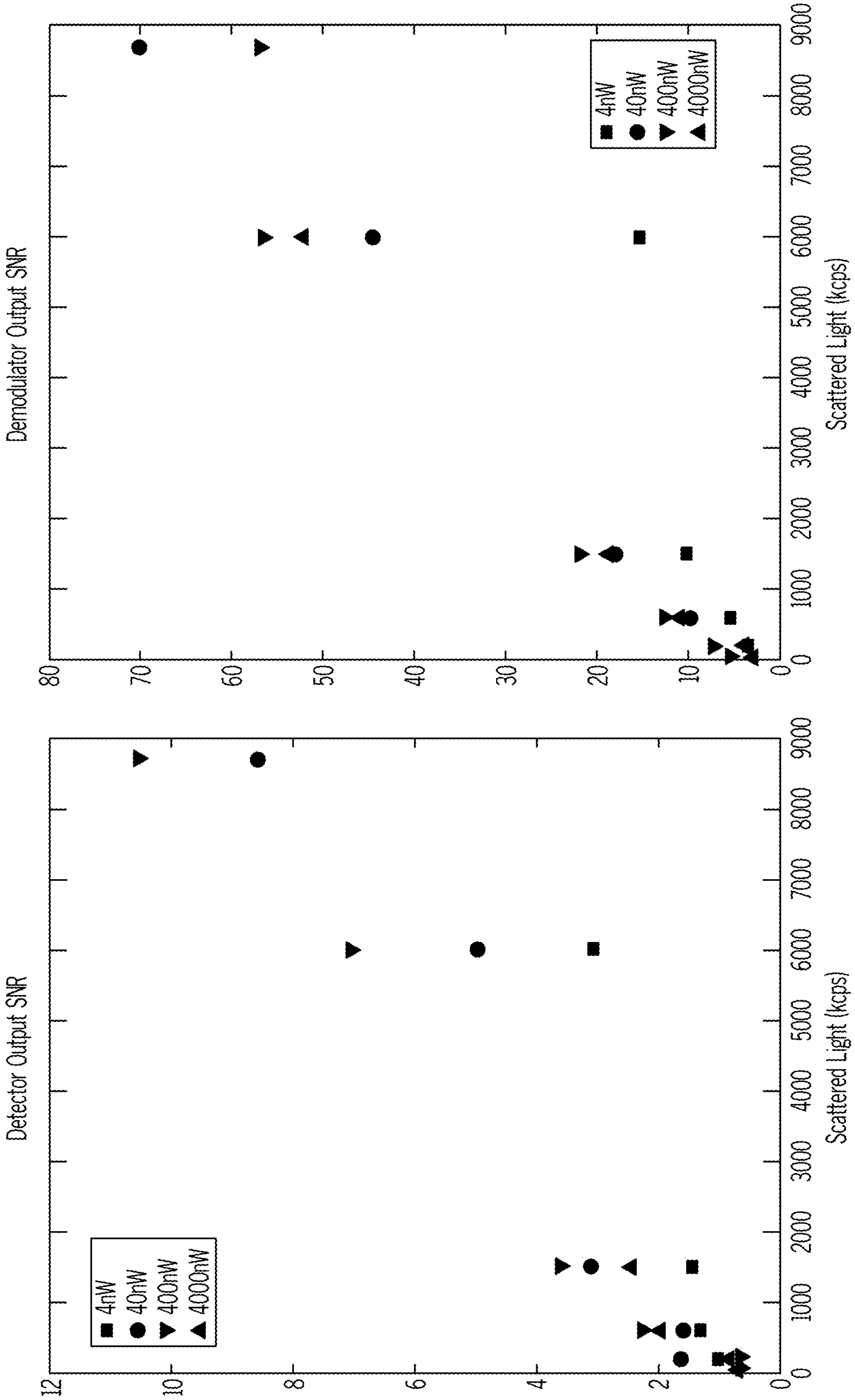
FIG. 8 depicts a graph in accordance with an embodiment.

For example, FIG. 7 depicts how in-phase quadrature phase demodulator 145, 245 could clean up the output of photo detector 13, 235, such that a single peak 710 (e.g., at 10 kHz) could be observed. Also, FIG. 8 depicts how in-phase quadrature phase demodulator 145, 245 and attenuator 150, 250 could result in a greater signal to noise ratio (SNR), with higher power reference light being transmitted to photo detector 135, 235, such that the noise from the light source is much greater (at least 10 times greater) than the noise equivalent power (NEP) of photo detector 135, 235 (noise from the detector).

In an embodiment, the apparatus generates and detects only one beat signal, where the beat signal is comprised of the overlap between the scattered light and reference light. For example, the acousto-optic modulator (AOM) produces an 80 MHz frequency shift on a light beam that is sent through the AOM, where an 80 MHz electrical signal is applied to a piezoelectric transducer inside the AOM, causing the incoming light to diffract and acquire an optical frequency shift that is perfectly in-sync/in-phase with the applied 80 MHz electrical signal. There is a continuous and constant frequency shift (no non-linear push and pull), therefore no linearization, no stitching together of data, and only a single, known frequency.

In a further example, the 80 MHz-shifted optical beam is then sent into the sample and scattered light (that has been further frequency shifted due to the moving particles) is collected, which is then combined with unmodulated laser light, which forms a beat signal at 80 MHz plus any Doppler shift that the sample introduced to the scattered light. For example, the apparatus then compares the beat signal against the original 80 MHz electrical signal that was used to drive the AOM, where this electrical signal has much better phase and frequency stability than a second optical beat signal and, is extremely well phase and frequency matched with the detected optical beating signal. Also, for example, the RF drive signal to the AOM can be used directly in the demodulation.

Also, for example, the apparatus generates a reference frequency that is 80 MHz instead of a few kHz, allowing for many more cycles of the beat signal to be measured and demodulated by (i.e., compared against) the original 80 MHz electrical signal (e.g., using millions of cycles for the comparison), thereby improving the frequency precision.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising: a long coherence length laser;
- a fiber splitter optically coupled to the long coherence length laser;
- a polarization maintaining acousto-optic modulator optically coupled to a sample arm output of the fiber splitter;
- a sample cell to contain a sample and optically coupled to an output of the polarization maintaining acousto-optic modulator;
- a polarization maintaining combiner optically coupled to a reference arm output of the fiber splitter and to an output of the sample cell;
- a photo detector to detect light outputted from the polarization maintaining combiner;
- a radio frequency source electrically coupled to an input of the polarization maintaining acousto-optic modulator; and
- an in-phase quadrature phase demodulator electrically coupled to an output of the photo detector and electrically coupled to an output of the radio frequency source, to output in-phase data and quadrature phase data to be analyzed for shifts in frequency to measure electrophoretic mobility in the sample.

2. The apparatus of claim 1 further comprising at least one polarization maintaining fiber coupling any of the long coherence length laser, the fiber splitter, the polarization maintaining acousto-optic modulator, the sample cell, and the polarization maintaining combiner together.

3. The apparatus of claim 1 wherein any of the fiber splitter, the polarization maintaining acousto-optic modulator, and the polarization maintaining combiner are fused together.

4. The apparatus of claim 1 wherein the fiber splitter comprises a split ratio wherein a majority of laser light emitted by the long coherence length laser is directed to the sample cell.

5. The apparatus of claim 1 wherein the sample cell comprises a shutter between a cell enclosure and a collimator.

6. The apparatus of claim 1 wherein the polarization maintaining acousto-optic modulator comprises a polarizer.

7. The apparatus of claim 1 further comprising a polarization maintaining attenuator optically coupled to the reference arm output of the fiber splitter.

8. The apparatus of claim 1 wherein the in-phase quadrature phase demodulator comprises a low pass filter to the in-phase data and the quadrature phase data.

9. An apparatus comprising: a long coherence length laser;

a fiber splitter optically coupled to the long coherence length laser;

a polarization maintaining acousto-optic modulator optically coupled to a reference arm output of the fiber splitter;

a sample cell to contain a sample and optically coupled to a sample arm output of the fiber splitter;

a polarization maintaining combiner optically coupled to an output of the polarization maintaining acousto-optic modulator and to an output of the sample cell;

a photo detector to detect light outputted from the polarization maintaining combiner;

a radio frequency source electrically coupled to an input of the polarization maintaining acousto-optic modulator; and an in-phase quadrature phase demodulator electrically coupled to an output of the photo detector and electrically coupled to an output of the radio frequency source, to output in-phase data and quadrature phase data, to be analyzed for shifts in frequency to measure electrophoretic mobility in the sample.

10. The apparatus of claim 9 further comprising at least one polarization maintaining fiber coupling any of the long coherence length laser, the fiber splitter, the polarization maintaining acousto-optic modulator, the sample cell, and the polarization maintaining combiner together.

11. The apparatus of claim 9 wherein any of the fiber splitter, the polarization maintaining acousto-optic modulator, and the polarization maintaining combiner are fused together.

12. The apparatus of claim 9 wherein the fiber splitter comprises a split ratio wherein a majority of laser light emitted by the long coherence length laser is directed to the sample cell.

13. The apparatus of claim 9 wherein the sample cell comprises a shutter between a cell enclosure and a collimator.

14. The apparatus of claim 9 wherein the polarization maintaining acousto-optic modulator comprises a polarizer.

15. The apparatus of claim 9 further comprising a polarization maintaining attenuator optically coupled to the reference arm output of the fiber splitter.

16. The apparatus of claim 9 wherein the in-phase quadrature phase demodulator comprises a low pass filter to the in-phase data and the quadrature phase data.

17. An apparatus comprising: a long coherence length laser;

a fiber splitter optically coupled to the long coherence length laser;

a polarization maintaining acousto-optic modulator optically coupled to an output of the fiber splitter;

a sample cell to contain a sample and optically coupled to an output of the fiber splitter;

a polarization maintaining combiner optically coupled to an output of the polarization maintaining acousto-optic modulator and to an output of the sample cell;

a photo detector to detect light outputted from the polarization maintaining combiner;

a radio frequency source electrically coupled to an input of the polarization maintaining acousto-optic modulator; and an in-phase quadrature phase demodulator electrically coupled to an output of the photo detector and electrically coupled to an output of the radio frequency source, to output in-phase data and quadrature phase data to be analyzed for shifts in frequency to measure electrophoretic mobility in the sample.

* * * * *